United States Patent
Long et al.

(10) Patent No.: US 8,222,181 B2
(45) Date of Patent: Jul. 17, 2012

(54) DESULFURIZING ADSORBENT, PREPARATION METHOD AND USE THEREOF

(75) Inventors: Jun Long, Beijing (CN); Huiping Tian, Beijing (CN); Wei Lin, Beijing (CN)

(73) Assignees: China Petroleum & Chemical Corporation, Beijing (CN); Research Institute of Petroleum, Sinopec, Beijing (CN)

( * ) Notice: Subject to any disclaimer, the term of this patent is extended or adjusted under 35 U.S.C. 154(b) by 369 days.

(21) Appl. No.: 12/494,778

(22) Filed: Jun. 30, 2009

(65) Prior Publication Data

US 2009/0321321 A1    Dec. 31, 2009

(30) Foreign Application Priority Data

Jun. 30, 2008    (CN) .......................... 2008 1 0115871

(51) Int. Cl.
  *C10G 29/16*    (2006.01)

(52) U.S. Cl. ............ 502/407; 502/80; 502/84; 502/400; 502/414; 208/243; 208/244; 208/247; 208/249; 208/299

(58) Field of Classification Search .......... 208/243–244, 208/247, 249, 299; 502/80, 84, 400, 407, 502/414

See application file for complete search history.

(56) References Cited

U.S. PATENT DOCUMENTS

| | | | |
|---|---|---|---|
| 6,132,518 A * | 10/2000 | Milinkovic et al. | 118/719 |
| 2005/0020446 A1 * | 1/2005 | Choudhary et al. | 502/407 |
| 2008/0171890 A1 * | 7/2008 | Kim et al. | 556/146 |

FOREIGN PATENT DOCUMENTS

| | | |
|---|---|---|
| CN | 1110931 A | 11/1995 |
| CN | 1151333 A | 6/1997 |
| CN | 1355727 A | 6/2002 |
| CN | 1382071 A | 11/2002 |
| CN | 1422177 A | 6/2003 |
| CN | 1627988 A | 6/2005 |

OTHER PUBLICATIONS

Ko, Y-G. et al. (2002). Catalysis Letters, 83(3-4), 157-160.*

* cited by examiner

*Primary Examiner* — Walter D Griffin
*Assistant Examiner* — Brian McCaig
(74) *Attorney, Agent, or Firm* — Scully, Scott, Murphy & Presser, P.C.

(57) ABSTRACT

The invention provides an adsorbent for removing sulfur from cracking gasoline or diesel fuel, which adsorbent comprises: (1) a carrier consisting of a source of silica, an inorganic oxide binder, and at least one oxide of metal selected from Groups IIB, VB and VIB; (2) at least one accelerant metal which is capable of reducing the sulfur in oxidized state to hydrogen sulfide and has a $\eta<0.5$, wherein $\eta$=(the amount in percentage of accelerant metal in crystal phase)/(the amount in percentage of accelerant metal in the adsorbent). The active components in the adsorbent can be evenly dispersed on the carrier in a matter close to monolayer dispersion, and which greatly improves the activity of the adsorbent. The preparation method and the use of the above adsorbent are provided.

23 Claims, 1 Drawing Sheet

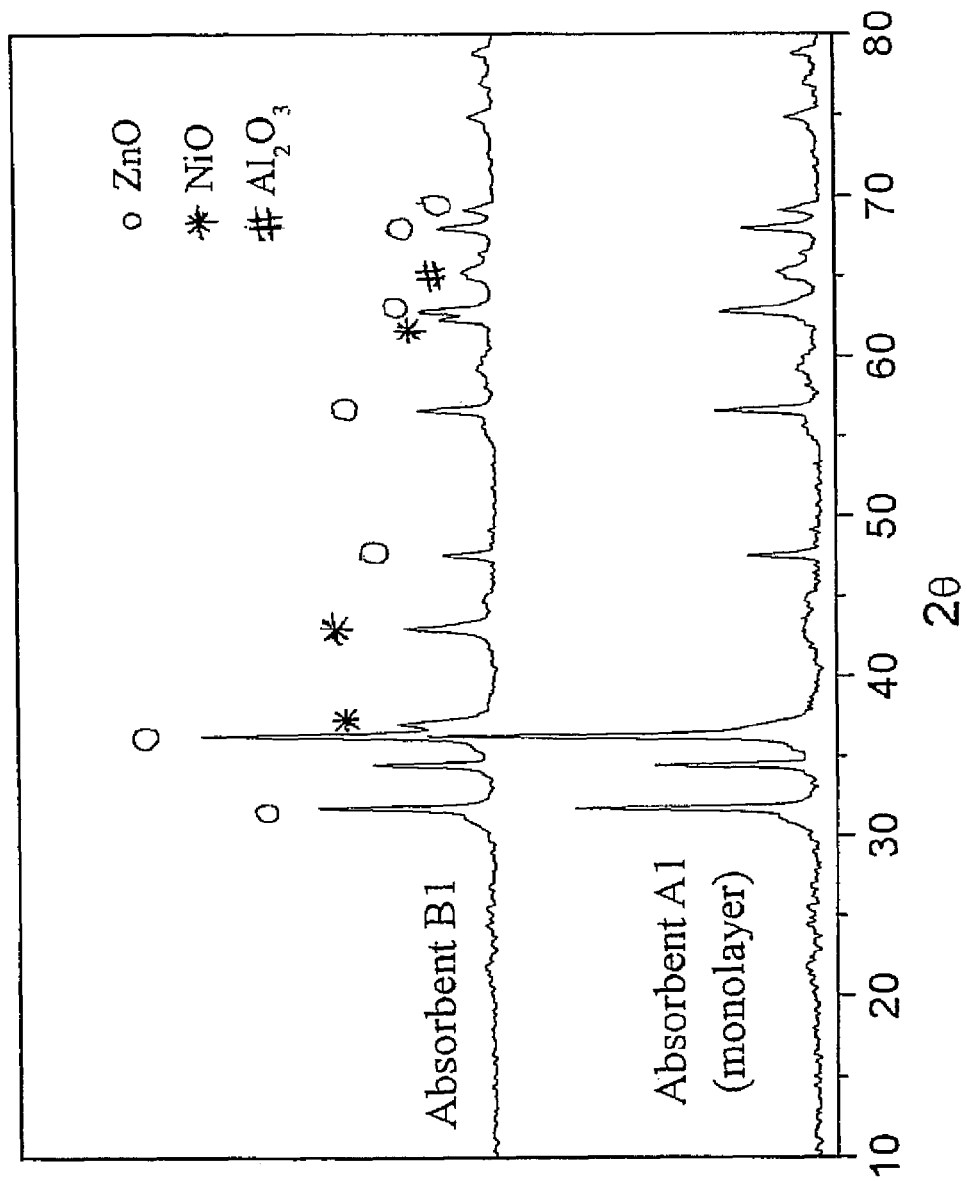

DESULFURIZING ADSORBENT, PREPARATION METHOD AND USE THEREOF

FIELD OF THE INVENTION

The present invention relates to an adsorbent for removing sulfur from liquid fuels such as cracking gasoline and diesel fuel.

BACKGROUND OF THE INVENTION

With increasing recognition of environmental protection, environmental regulations are gradually becoming stricter. It is believed that decreasing the sulfur content in gasoline or diesel fuel is one of the most important measures to improve the air quality because the sulfur contained in the fuel adversely affects the performance of the catalytic converter of automobiles and vehicles. The sulfur oxide present in the exhaust gas from automobile engine inhibits the activity of the noble metal catalyst in the converter and poisons the catalyst irreversibly. The gases released from the ineffective or poisoned converter comprise uncombusted non-methane hydrocarbons, nitrogen oxide and carbon monoxide, all of which easily form photochemical smogs when catalyzed by sunlight.

In China, most sulfur contained in gasolines comes from heat processed gasoline, which is mainly catalytic cracking gasoline. Therefore, decreasing the sulfur content in the cracking gasoline would facilitate reducing sulfur content of these gasolines. The current standard for gasoline product is GB 17930-2006 "Motor Vehicle Gasoline," which further restricts the sulfur content of gasoline and requires that by Dec. 31, 2009 the sulfur content of gasoline should be lowered to 50 ppm. This circumstance means that cracking gasoline must be desulfurized to a great degree in order to meet the environmental requirement.

When lowering the sulfur content of motor vehicle fuel, changes in olefin content which leads to a reduction of octane number (including Research Octane Number, ROM and Motor Octane Number, MON) should be avoided so to retain the combustion characteristics of the motor vehicle fuel. Generally, the negative change on the olefin content is caused by the hydrogenation reaction induced upon removal of thiophene compounds (including thiophene, benzothiophene, alkylthiophene, alkylbenzothiophene and alkyldibenzothiophene). Further, the loss of aromatic hydrocarbons in the cracking gasoline due to saturation under hydrogenation condition should also be avoided. Therefore, the most desirable approach is to desulfurize the gasoline while retain its octane number.

On the other hand, both hydrodesulfurization and hydrogenation of hydrocarbons consume hydrogen, thereby increasing the operation cost of the desulfurization. Accordingly, there is a need for a method of desulfurization without consuming large volume of hydrogen, thereby providing a more economical method for treatment of cracking gasoline or diesel fuel.

Traditionally, a fixed-bed process is usually used for desulfurization in a liquid phase. However, this process is disadvantageous in the homogeneity of reaction and the regeneration of the material. Compared with the fixed-bed process, a fluidized-bed process is advantageous given wider applications prospects in the future because of better heat transfer and pressure drop. In this context, a fluidized-bed reactor is usually provided with granular reactants; and the catalyst particulate used needs sufficient abrasion-resistance. Accordingly, it is of great significance to find an adsorbent with both excellent abrasion-resistance and desulfurization performance.

Chinese Patents CN 1110931A and CN 1151333A describe a new absorption composition comprising zinc oxide, silicon dioxide, colloidal oxide and an accelerant; and a process for making the same. In the process, fluidizable particles are produced by a pressure forming technique, and the particle pore volumes are increased by adding to the colloid a pore-forming agent which becomes flammable when heated.

U.S. Pat. No. 6,150,300, Chinese Patent publications CN 1355727A and CN 1382071A disclose a granular adsorbent composition comprising a mixture of zinc oxide, silica, alumina, nickel or cobalt in a reduced state. The adsorbent is made by first mixing silica, alumina and zinc oxide under shearing force, and preparing the solid particle through a granulating machine. In these methods the active component nickel is introduced by impregnation.

Chinese Patent publications CN1422177A and CN 1627988A disclose an abrasion resistant adsorbent composition prepared by impregnating an adsorbent carrier comprising zinc oxide, expanded perlite and alumina with an accelerant such as nickel, nickel oxide, or with a precursor of nickel oxide, and subsequently reducing the valence of the accelerant metal in the resulting accelerant metal adsorbent carrier composition. The adsorbent composition is useful for removing elemental sulfur and sulfide, for example hydrogen sulfide and organic sulfide, from cracking gasoline and diesel fuel. According to these patents, the active component can be introduced by impregnating the adsorbent carrier with an accelerant metal containing precursor, which impregnation method is advantageous in easy preparation and implementation. However, the accelerant metal introduced thereby often does not have sufficient homogeneity, which can lead to insufficient desulfurizing activity in the adsorbent. In this situation, the amount of accelerant metal used is typically increased to enhance the activity of the adsorbent, but which also increases the cost of making the adsorbent.

SUMMARY OF THE INVENTION

The present invention provides an adsorbent for removing sulfur from cracking gasoline or diesel fuels, the adsorbent having significantly improved activity. In one embodiment, the subject adsorbent has active components evenly dispersed on the carrier. In another embodiment, the active components are dispersed substantially as a monolayer dispersion on the carrier.

The present invention also provides a method for making such an adsorbent. The present invention further provides a use of such an adsorbent in, e.g., removing elemental sulfur and sulfide from cracking gasoline and/or diesel fuels.

In one practice, the adsorbent according to the invention comprises:
1) a carrier comprising a source of silica, inorganic oxides binder, and at least one oxide of metal selected from Groups IIB, VB and VIB;
2) at least one accelerant metal which is capable of reducing sulfur in an oxidized state to hydrogen sulfide, and which has a value of η<0.5.

The parameter "η" is defined as follows:

$$\eta = \text{(the amount, by percentage, of accelerant metal in the crystal phase)/(the amount, by percentage, of accelerant metal in the adsorbent).}$$

Techniques to measure the percentages wherefrom η is calculated are exemplified hereinafter.

The adsorbent provided herein comprises from about 1 to about 40 wt % of a source of silica, and from about 10 to about 80 wt % of metal oxide, and about 3 to about 35 wt % of inorganic oxide binder in terms of oxides, and about 3 to about 30 wt % of accelerant metal in terms of oxides, based on the total weight of the adsorbent. Preferably, the adsorbent comprises from about 10 to about 25 wt % of a source of silica, from about 40 to about 60 wt % of metal oxide, about 10 to about 18 wt % of inorganic oxide binder in terms of oxides, and about 5 to about 20 wt % of accelerant metal in terms of oxides, based on the total weight of the adsorbent. More preferably, the accelerant metal content is in the range of about 8 to about 20 wt %.

According to the adsorbent provided herein, the source of silica can be either pure silica or a silica-containing mixture, for example, one or more of clay (e.g. kaolin, pillared clay etc.), diatomite, expanded perlite, siliceous rock, hydrolysis silica, macroporous silica, and silica gel. Examples of such pillared clay include but are not limited to: rectorite, Yunmeng clay, bentonite, montmorillonite and smectite; rectorite is preferred.

The inorganic oxide binder herein is a silica-alumina oxide binder, which can be selected from one or more of alumina, silica, and amorphous silica-alumina; alumina is preferred, more preferably selected from one or more of γ-alumina, η-alumina, θ-alumina, and χ-alumina.

The metal oxide herein is an oxide of one or more metals selected from Group IIB, VB, and VIB, or any other metal oxide having sulfur storage properties; oxides of vanadium, zinc or molybdenum are preferred; and most preferably zinc oxide.

The accelerant metal can be comprised of any metal capable of reducing oxidized sulfur to hydrogen sulfide. Preferred are one or more metals selected from nickel, cobalt, manganese, iron, copper, silver, molybdenum, chromium, vanadium, tungsten, and lanthanide; most preferably, the accelerant metal contains nickel.

In some embodiments according to the present invention, $\eta<0.5$, in other embodiments, $\eta=0$, i.e. at least one accelerant metal which is capable of reducing the sulfur in oxidized state to hydrogen sulfide is dispersed on the surface of the carrier substantially as a monolayer.

It must be noted that, as used in the specification and the appended claims, the singular forms "a", "an" and "the" include plural referents unless the context clearly dictates otherwise.

The term "cracking gasoline" as used herein means hydrocarbons having a boiling range of 40° C. to 210° C. or any fractions thereof produced by thermal cracking or by catalytic cracking higher hydrocarbon molecules into small molecules. Suitable thermal cracking processes include but are not limited to pyrolysis, thermal cracking, visbreaking or combinations thereof. Examples of suitable catalytic cracking processes include but are not limited to fluidized-bed catalytic cracking and heavy oil catalytic cracking and combinations thereof. Therefore, suitable catalytic cracking gasoline includes but is not limited to coked gasoline, thermal cracking gasoline, visbreaking gasoline, fluidized-bed catalytic cracking gasoline, heavy oil cracking gasoline and combinations thereof. According to the process of the invention, it is possible in some cases to fractionate and/or hydrogenate the cracking gasoline prior to desulfurization when used as hydrocarbon containing fluid.

The term "diesel fuel" as used herein means any hydrocarbon mixture or any fractions thereof with boiling range of 170° C. to 450° C. Such hydrocarbon containing fluids include but are not limited to light cycle oil, kerosene, straight-run diesel oil, hydrogenated diesel oil and combinations thereof.

The term "sulfur" as used herein means the element sulfur in any form, such as organic sulfide existing in hydrocarbon-containing liquids such as cracking gasoline or diesel fuel. Sulfur contained in the hydrocarbon-containing liquid according to the present invention includes but is not limited to carbonyl sulfide (COS), carbon disulfide ($CS_2$), mercaptans or other thiophene compounds and combinations thereof particularly thiophene, benzothiophene, alkylthiophene, alkylbenzothiophene, and alkyldibenzothiophene, and thiophene compounds having higher molecular weight than usually contained in diesel fuel.

The present invention also provides a process for preparing an adsorbent, comprising the steps of:

(1) Contacting a source of silica, an inorganic oxide binder precursor, and an oxide of one or more metals selected from Group IIB, VB and VIB or a precursor thereof, and molding, and drying the mixture to form a carrier;

(2) loading the carrier in a fluidized bed, and passing an organic compound containing an accelerant metal capable of reducing oxidized sulfur to hydrogen sulfide, said organic compound carried by gas, to obtain an adsorbent precursor;

(3) drying and calcinating the adsorbent precursor obtained in step (2) so as to convert the organic compound containing an accelerant metal to a metal oxide;

(4) reducing the adsorbent precursor treated in step (3) in a reductive atmosphere so that the accelerant metal substantially presents itself in a reduced state, and the adsorbent has a value of $\eta<0.5$, wherein $\eta$=(the amount in percentage of accelerant metal in crystal phase)/(the amount in percentage of accelerant metal in the adsorbent).

In step (1), the carrier can be prepared in accordance with methods known in the art. For example, a microspheric carrier can be made by mixing and beating a source of silica, an inorganic oxide binder precursor, an oxide of one or more metals selected from Group IIB, VB and VIB or a precursor thereof, and water in an acidic condition, thus obtaining a slurry with about 10-about 40 wt % of solids, followed by spray drying.

In step (1), the source of silica is selected from one or more of clay (e.g. kaolin, pillared clay etc.), diatomite, expanded perlite, siliceous rock, hydrolysis silica, macroporous silica, and silica gel, preferably one or more of expanded perlite, diatomite and clay. Examples of such pillared clay include but are not limited to: rectorite, Yunmeng clay, bentonite, montmorillonite and smectite; rectorite is preferred.

In step (1), an oxide of one or more metals selected from Group IIB, VB and VIB or precursor thereof, includes the oxides per se or the precursors thereof, wherein the precursor of the oxides are compounds which can be converted to oxides under the above preparation conditions. The examples of these compounds are for example sulfides, sulfates, hydroxides, carbonates, acetates and nitrates of one or more Group IIB, VB and VIB metals. The preferred metal oxides are oxide of vanadium, zinc or molybdenum, most preferably the zinc oxide.

In step (1), the inorganic oxide binder precursor represents a material which can form a heat resistant inorganic oxide during the process of making the adsorbent, including for example, one or more of alumina, silica and amorphous silica-alumina precursor. For example, the precursor of alumina can be selected from hydrated alumina and/or aluminum sol; the hydrated alumina is selected from one or more of boehmite, pseudo-boehmite, alumina trihydrate, amorphous aluminium hydroxide. The precursor of silica can be selected from one or more of silica sol, silica gel and water glass. The precursor of the amorphous silica-alumina can be selected from one or more of silica-alumina sol, mixture of silica sol and alumina sol, and silica-alumina gel. Those precursors of heat resistant inorganic oxides are known to the ordinary person skilled in the art.

According to the process of the present invention, it is preferred to calcinate the dried carrier after step (1). The calcinating temperature is about 350° C. to about 700° C., preferably about 450° C. to about 650° C., and the calcinating time is about 1 to about 10 hour, preferably about 1 to about 4 hour.

In step (2), the gas is non-oxidative gas, preferably inert gas, such as nitrogen, particularly preferred is anhydrous inert gas. The pressure of the gas is about 1 to about 5 atm, preferably about atmospheric pressure. The gas temperature is about 50° C. to about 200° C., preferably about 50° C. to about 130° C.

In step (2), the accelerant metal can be any metal capable of reducing oxidized sulfur to hydrogen sulfide. Preferred are one or more metals selected from nickel, cobalt, manganese, iron, copper, silver, molybdenum, chromium, vanadium, tungsten, and lanthanide, and most preferably, the accelerant metal contains nickel. The organic compound of the accelerant metal is selected from one or more of formates, acetates, metal carbonyls, and naphthenates with vapor pressure of about 0.5 to about 100 kPa under room temperature (298K). According to one embodiment of the present invention, the accelerant metal used was nickel carbonyl, specifically nickel tetracarbonyl.

In step (3), the adsorbent precursor is calcinated at about 300° C. to about 800° C., preferably about 450° C. to about 750° C. for about 0.5 hour to about 4 hours, preferably for about 1 hour to about 3 hours in the presence of oxygen or an oxygen-containing atmosphere until volatile materials are removed and the accelerant metals are transformed into metal oxide.

In step (4), it is preferred to reduce the accelerant metals in a reducing atmosphere before using the adsorbent, thereby producing the accelerant metals in substantially reduced state (preferably zero valence), and in turn producing the adsorbent of the present invention. The reducing temperature is about 300° C. to about 600° C., preferably about 400° C. to about 500° C. The reducing time is about 0.5 hours to 6 hours, preferably about 1 hour to about 3 hours. The reducing gas amounts to about 10% to about 100% by volume in the reducing atmosphere; the preferred reducing gas is hydrogen gas, and the remainder can be inert gas, for example nitrogen gas or argon gas.

The adsorbent obtained by step (4) has a $\eta<0.5$; At $\eta=0$, at least one accelerant metal which is capable of reducing the sulfur in oxidized state to hydrogen sulfide is dispersed on the surface of the carrier substantially as a monolayer.

The present invention further provides a method for desulfurizing cracking gasoline or diesel fuel, comprising contacting the sulfur containing material with the adsorbent according to the invention, during which the sulfur contained in the material is adsorbed by the adsorbent and a product having low sulfur content is thereby obtained.

The contacting conditions in this regard are as follows:
temperature: about 350° C. to about 500° C., preferably about 400° C. to about 425° C.;
weight space velocity: about 2 to about 8 $h^{-1}$, preferably about 4 to about 6 $h^{-1}$;
pressure: about 1000 to about 5000 KPa, preferably about 1500 to about 3000 Kpa;
atmosphere: reducing atmosphere, preferably hydrogen atmosphere;
wherein, the adsorbent can be recycled after going through the oxidation-reduction regeneration process.

The desulfurizing property of the adsorbent largely depends on the effective content of the accelerant metal, which relates to the amount of the accelerant metal capable of contacting and adsorbing sulfur on the adsorbent. The desulfurizing property of the adsorbent increases with the increasing of the amount of the accelerant metal before the effective content of the accelerant metal reaches a certain value of $\eta$. However, the desulfurizing property of the adsorbent cannot be improved even by increasing the amount of the accelerant metal after the effective content of the accelerant metal reaches a certain value of $\eta$.

It is defined that $\eta$=(the amount in percentage of accelerant metal in crystal phase)/(the amount in percentage of accelerant metal in the adsorbent). If the accelerant metal is highly dispersed on the surface of the adsorbent, there is no peak corresponding to the accelerant metal in the adsorbent in the crystal phase analysis, and then the amount in percentage of accelerant metal in crystal phase equals zero, thereby $\eta=0$. The lower the value of $\eta$ is, the less of the amount of the accelerant metal available to contact and absorb sulfur is. Therefore, $\eta$ is indicative of the dispersion of the accelerant metal on the surface of the adsorbent. That is, for the case of monolayer dispersion or close to monolayer dispersion occurs when $\eta=0$; the accelerant metal begins to agglomerate and some of accelerant metal is not present on the surface any longer when $\eta>0$. The larger the value of $\eta$ is, the greater the amount of the accelerant metal in agglomerated state. Usually, the adsorbent prepared according to the present invention has a $\eta<0.5$, while the adsorbent prepared by the prior art has a $\eta>0.5$.

The gas fluidized-bed method used in the present invention can promote the monolayer dispersion of the organic compound of accelerant metal on the fluidized surface of the carrier. Further, the accelerant metal can also disperse on the surface of the carrier as a monolayer when calcinated and reduced to reduced state (substantially zero valence). The adsorbent exhibits its highest adsorbing desulfurizing activity when the amount of the accelerant metal used is such that the dispersion volume of the accelerant metal is the largest monolayer dispersion volume. The accelerant metal content in the adsorbent of the present invention is greatly lower than that introduced into the adsorbent by impregnating in the prior art when showing same activities, and therefore the production cost the adsorbent can be significantly reduced.

BRIEF DESCRIPTION OF THE DRAWINGS

FIG. 1 is an XRD patterns of the adsorbent A1 (the invention) and B1 (the prior art). The metal Ni which is monolayer dispersed in adsorbent A1 essentially shows no crystallization peak of nickel oxide, while the adsorbent B1 within which accelerant metal nickel being introduced by the method of the prior art shows a clear crystallization peak of nickel oxide (the characteristic crystallization peak is at 42.9°).

DETAILED DESCRIPTION OF THE INVENTION

While embodiments of the present disclosure are described in connection with the above embodiments and the corresponding text and figures, there is no intent to limit the claims to the embodiments in these descriptions. On the contrary, the intent is to cover all alternatives, modifications, and equivalents included within the spirit and scope of embodiments of the present disclosure.

The present invention will be further illustrated with reference to the following examples, but not limited thereby.

Example 1

0.80 kg of expanded perlite (available from Worldminerals, M27, having a dry basis of 0.79 kg), 0.71 kg of Kaolin (available from Suzhou Kaolin Colo., S1, having a dry basis of 0.59 kg), 1.15 kg of alumina (available from Shandong Aluminum Corporation, having a dry basis of 0.78 kg) and 9.0 kg of acidic water (decationized water, pH 3) were mixed under stirring, and subsequently added with 110 ml of 30% HCl (chemically pure grade, available from Beijing Chemical Works) under stirring for acidifying for 1 hour. Thereafter, 3.5 kg of powder zinc oxide was added, mixed and stirred for 1 hour to obtain a carrier slurry. The slurry was spray dried using a Niro Bowen Nozzle Tower™ spray drier, with a pressure of 8.5-9.5 MPa, an inlet temperature of below 500° C., and an outlet temperature of about 150° C. The microsphere thus produced was dried at 180° C. for 1 hour, and then calcinated at 635° C. for 1 hour to obtain an adsorbent carrier.

The adsorbent carrier was loaded in a fluidized-bed, and being passed by high purity nitrogen gas carrying nickel tetracarbonyl (50° C.) for 6 hours. Then the adsorbent carrier loaded with nickel was taken out and calcinated in the air at 650° C. for 1 hour to produce an adsorbent precursor. The adsorbent precursor was reduced under hydrogen atmosphere at 425° C. for 2 hours to produce an adsorbent, which is reported as adsorbent A1.

The adsorbent A1 is composed of 57.9 wt. % of zinc oxide, 12.7 wt. % of alumina binder, 12.8 wt. % of expanded perlite, 9.6 wt. % of Kaolin, and 8.0 wt. % of nickel (as nickel oxide).

Example 2

Replacing the adsorbent carrier with the precursor of the adsorbent A1, the process of introducing nickel by vapor adsorbent deposition was repeated. Then the adsorbent precursor was calcinated at 635° C. in the air for 1 hour to produce an adsorbent precursor, which was reduced under hydrogen atmosphere at 410° C. for 4 hours to produce an adsorbent, which is reported as adsorbent A2.

The adsorbent A2 is composed of 54.5 wt. % of zinc oxide, 12.1 wt. % of alumina binder, 12.3 wt. % of expanded perlite, 9.2 wt. % of Kaolin, and 11.9 wt. % of nickel (as nickel oxide).

Example 3

The adsorbent was prepared as follows: 3.5 kg of powder zinc oxide (available from Beijing Chemical Works) and 4.97 kg of deionized water were mixed, and subsequently stirred for 30 minutes to obtain a zinc oxide slurry.

0.61 kg of diatomite (available from Beijing Chemical Reagent Co., Ltd, having a dry basis of 0.58 kg), 0.96 kg of rectorite (available from Qilu Petrochemical Catalyst Company, having a dry basis of 0.80 kg), alumina (from Shandong Aluminum Corporation, having a dry basis of 0.82 kg), and 5.0 kg of acidic water (decationized water, pH 3) were mixed under stirring, and then added with 115 ml of 30% HCl (chemically pure grade, available from Beijing Chemical Works) under stirring for acidifying for 1 hour. Thereafter, the above powder zinc oxide was added, mixed and stirred for 1 hour to obtain a carrier slurry. The slurry was spray dried using a Niro Bowen Nozzle Tower™ spray drier, with a pressure of 8.5-9.5 MPa, an inlet temperature of below 500° C., and an outlet temperature of about 150° C. The microspheres thus produced were dried at 180° C. for 1 hour, and then calcinated at 635° C. for 1 hour to obtain an adsorbent carrier.

The adsorbent carrier was loaded in a fluidized-bed, and being passed by high purity nitrogen gas carrying nickel tetracarbonyl (50° C.) for 6 hours. Then the adsorbent carrier was calcinated in the air at 630° C. for 1 hour to produce an adsorbent precursor. The adsorbent precursor was reduced under hydrogen atmosphere at 425° C. for 2 hours to produce an adsorbent, which is reported as adsorbent A3.

The adsorbent A3 is composed of 57.9 wt. % of zinc oxide, 12.7 wt. % of alumina binder, 9.5 wt. % of diatomite, 12.9 wt. % of rectorite, and 8.0 wt. % of nickel (as nickel oxide).

Comparative Example 1

The adsorbent carrier was prepared according to the method of Example 1 with the following differences. 3.24 kg of the adsorbent carrier (having a dry basis of 3.0 kg) was impregnated with 1.03 kg of nickel nitrate hexahydrate and 0.2 kg of deionized water.

The mixture thus obtained was dried at 180° C. for 4 hours, and calcinated in the air at 635° C. for 1 hour to obtain an adsorbent precursor. The adsorbent precursor was reduced under hydrogen atmosphere at 425° C. for 2 hours to produce an adsorbent, which is reported as adsorbent B1.

The adsorbent B1 is composed of 57.9 wt. % of zinc oxide, 12.7 wt. % of alumina binder, 12.8 wt. % of expanded perlite, 9.6 wt. % of Kaolin, and 8.0 wt. % of nickel (as nickel oxide).

Comparative Example 2

The adsorbent carrier was prepared according to the method of Example 2 with the following differences. 3.24 kg of the adsorbent carrier (having a dry basis of 3.0 kg) was impregnated with 1.03 kg of nickel nitrate hexahydrate and 0.2 kg of deionized water. The mixture thus obtained was dried at 180° C. for 4 hours, and calcinated in the air at 635° C. for 1 hour to obtain an adsorbent precursor. The adsorbent precursor was reduced under hydrogen atmosphere at 425° C. for 2 hours to produce an adsorbent, which is reported as adsorbent B2.

The adsorbent B2 is composed of 54.5 wt. % of zinc oxide, 12.1 wt. % of alumina binder, 12.3 wt. % of expanded perlite, 9.2 wt. % of Kaolin, and 11.9 wt. % of nickel (as nickel oxide).

Comparative Example 3

The adsorbent carrier was prepared according to the method of Example 3 with the following differences. 3.24 kg of the adsorbent carrier (having a dry basis of 3.0 kg) was impregnated with 1.61 kg of nickel nitrate hexahydrate and 0.3 kg of deionized water. The mixture thus obtained was dried at 180° C. for 4 hours, and calcinated in the air at 635° C. for 1 hour to obtain an adsorbent precursor. The adsorbent precursor was reduced under hydrogen atmosphere at 425° C. for 2 hours to produce an adsorbent, which is reported as adsorbent B3.

The adsorbent B3 is composed of 57.9 wt. % of zinc oxide, 12.7 wt. % of alumina binder, 9.5 wt. % of diatomite, 12.9 wt. % of rectorite, and 8.0 wt. % of nickel (as nickel oxide).

Example 4

In order to differentiate the above different adsorbents, the crystal phase compositions of the pre-reduced adsorbents A1-A3 and B1-B3 were measured and values of η calculated. The crystal phase was analyzed using X-ray diffraction and Phase Filtering (R. V. Siriwardane, J. A. Poston, C. Evans, Jr. Ind. Eng. Chem. Res. 33 (1994) 2810-2818), an adapted form of Rietveld modeling (RIQAS rietveld analysis, Operators Manual, Material Data, Inc., Berkley, Calif. (1999)) and calculating the crystal phase compositions by fitting methodology. All X-ray diffraction measurements were taken using a Philips XRG 3100 generator equipped with a long fine focus copper X-ray source powered at 40 kV & 30 mA; Philips 3020 digital goniometer & Philips 3710 MPD control computer; and a Kevex PSI Peltier cooled silicon detector. The Kevex detector was operated with a Kevex 4601 ion pump controller, Kevex 4608 Peltier current supply, Kevex 4621 detector bias, Kevex 4561A pulse processor, and Kevex 4911-A single channel analyzer.

Diffraction patterns were acquired using Philips APD version 4.1c software. All Rietveld calculations were performed using Material Data, Inc. Riqas version 3.1c software (Outokumpu HSC Chemistry for Windows: Users Guide, Outokumpo Research Oy, Pori, Finland (1999)). The programs were run under the MS Windows® 2000 operating system using an Intel Pentium® IV 2.0 GHz class personal computer equipped with 512 MB of RAM. The crystal phase compositions of different samples were shown in Table 1.

Definition $\eta_{Ni}$=(percentage of Ni in crystal phase/percentage of Ni in adsorbent)

The effective content of Ni was analyzed by Method $H_2$-TPD, measured on Autochem II 2920 adsorption instrument of Micromeritics Co. The adsorbent samples were reduced by hydrogen gas at 450° C. for 1 hour, cooled to ambient temperature and purged for 30 min, and then purged with high pure $N_2$ to reach a stable baseline, and finally heated to 650° C. The signals were recorded by thermal conductivity detector and the total amount of the adsorbed hydrogen was calculated by peak area. Then the amount of Ni adsorbed with hydrogen atom, i.e. the effective nickel content was calculated based on the relationship of one hydrogen atom being adsorbed by on nickel atom. Said results are shown in Table 1.

TABLE 1

Crystal phase compositions of different adsorbents

|  | A1 | A2 | A3 | B1 | B2 | B3 |
|---|---|---|---|---|---|---|
| ZnO | 64 | 60 | 63 | 58 | 53 | 56 |
| $ZnAl_2O_4$ | 17 | 16 | 19 | 19 | 20 | 21 |
| Perlite | 19 | 18 | — | 14 | 14 | — |
| NiO | — | 5 | — | 9 | 13 | 9 |
| Rectorite | — | — | 21 | — | — | — |
| diatomite | — | — | — | — | — | 14 |
| Percentage of Ni in the crystal phase | 0 | 5 | 0 | 9 | 13 | 9 |
| Percentage of Ni in chemical composition | 8.0 | 11.9 | 8.0 | 8.0 | 11.9 | 8.0 |
| Effective nickel content, wt % | 7.5 | 7.6 | 7.4 | 4.6 | 5.5 | 4.6 |
| $\eta_{Ni}$ | 0 | 0.42 | 0 | 1.25 | 1.09 | 1.25 |

As can be seen from Table 1, NiO in adsorbents A1 and A3 is in a monolayer dispersion, and as such cannot be reflected in the crystal phase composition. That is, the percentage of Ni in the crystal phase equals to 0, and thus $\eta_{Ni}$=0. Adsorbent A2 has a $\eta_{Ni}$ of 0.42, indicating the effective nickel content is higher than the prior art ($\eta_{Ni}$ of comparative adsorbents B1, B2 and B3 are higher than 1). Also can be seen from the effective content, the adsorbents prepared according to the present invention had an effective nickel content around 7.5 wt %, while the adsorbents prepared by the prior art had an effective nickel content no more than 5.5 wt %.

Example 5

The strength of adsorbents prepared by different methods are evaluated by vertical tube abrasion method, which method may refer to method RIPP 29-90 in 《Analysis in petrochemicals, RIPP test methods》 Said results are reported in Table 2.

The following methods were employed to evaluate the desulfurization performance of these adsorbents. Aging treatment: the adsorbent was reduced under hydrogen atmosphere of 0.1 Mpa at 420° C. for 3 hours till all nickel contained in the adsorbent was reduced to zero valence. Then a gas mixture of 10 vol. % $H_2S$+10 vol. % $H_2$+80 vol. % $N_2$ was passed through the adsorbent which is kept at 420° C. for 2 hours. Purging with nitrogen to remove hydrogen in the system for 0.5 hour, and thereafter introducing air onto the adsorbent and keep the adsorbent at 510° C. for 2 hours for regeneration. Repeats this reduction-sulfuration-oxidative regeneration processes for three times.

A fixed-bed microreaction apparatus was used to evaluate the desulfurization performance. The material for adsorbing reaction is catalytic cracking gasoline having a sulfur content of 800 ppm. The adsorbing test was performed under nitrogen atmosphere at the weight space velocity of 4 $h^{-1}$. The sulfur contents of the gasoline after reaction are reported in Table 2.

TABLE 2

Desulfurization performances of adsorbents

| Absorbent | Material | A1 | A2 | A3 | B1 | B2 | B3 |
|---|---|---|---|---|---|---|---|
| Sulfur content of hydrocarbon gasoline after desulfurization/ppm | 800 | 15 | 13 | 15 | 48 | 29 | 51 |
| RON | 92.2 | 91.4 | 91.2 | 91.3 | 91.4 | 91.3 | 91.4 |
| MON | 81.1 | 81.1 | 81.1 | 81.0 | 81.0 | 81.1 | 81.1 |
| Change in octane number |  | 0.4 | 0.5 | 0.5 | 0.45 | 0.45 | 0.4 |

What is claimed is:

1. A desulfurizing adsorbent comprising:
    1) a carrier consisting of a source of silica, an inorganic oxide binder, and at least one oxide of metal selected from Groups IIB, VB and VIB;
    2) at least one accelerant metal which is capable of reducing the sulfur in oxidized state to hydrogen sulfide, wherein the adsorbent has a value η<0.5, wherein η=(the amount in percentage of accelerant metal in crystal phase)/(the amount in percentage of accelerant metal in the adsorbent).

2. The adsorbent of claim 1, wherein the adsorbent comprises from about 1 to about 40 wt % of a source of silica, from about 10 to about 80 wt % of metal oxides, about 3 to about 35 wt % of inorganic oxide binder in terms of oxides, and about 3 to about 30 wt % of accelerant metal in terms of oxides, based on the total weight of the adsorbent.

3. The adsorbent of claim 1, wherein the adsorbent comprises from about 10 to about 25 wt % of a source of silica, from about 40 to about 60 wt % of metal oxides, about 10 to about 18 wt % of inorganic oxide binder in terms of oxides, and about 5 to about 20 wt % of accelerant metal in terms of oxides, based on the total weight of the adsorbent.

4. The adsorbent of claim 1, wherein at least one accelerant metal which is capable of reducing the sulfur in oxidized state to hydrogen sulfide is dispersed on the surface of the carrier substantially as a monolayer.

5. The adsorbent of claim 1, wherein the source of silica is selected from one or more of clay, diatomite, expanded perlite, siliceous rock, hydrolysis silica, macroporous silica, and silica gel.

6. The adsorbent of claim 1, wherein the inorganic oxide binder is a silica-alumina oxide binder.

7. The adsorbent of claim 1, wherein the inorganic oxide binder is selected from one or more of alumina, silica and amorphous silica-alumina.

8. The adsorbent of claim 1, wherein the metal oxide is selected from an oxide of vanadium, zinc or molybdenum.

9. The adsorbent of claim 1, wherein the accelerant metal is one or more of nickel, cobalt, manganese, iron, copper, silver, molybdenum, chromium, vanadium, tungsten, and lanthanide.

10. The adsorbent of claim 1, wherein the accelerant metal comprises nickel.

11. A process for preparing the adsorbent of claim 1, comprising the steps of
    (1) contacting a source of silica, an inorganic oxide binder precursor and an oxide of one or more metals selected from Group IIB, VB and VIB or precursor thereof, and molding, and drying the mixture to form a carrier;
    (2) loading the carrier in a fluidized bed, and passing an organic compound containing an accelerant metal capable of reducing oxidized sulfur to hydrogen sulfide, said organic compound carried by gas to obtain an adsorbent precursor;
    (3) drying and calcinating the adsorbent precursor obtained in step (2) so as to convert the organic compound containing an accelerant metal to a metal oxide;
    (4) reducing the adsorbent precursor treated in step (3) in a reductive atmosphere so that the accelerant metal substantially presents itself in a reduced state, and the adsorbent has a value $\eta<0.5$, wherein $\eta=$(the amount in percentage of accelerant metal in crystal phase)/(the amount in percentage of accelerant metal in the adsorbent).

12. The process of claim 11, wherein the source of silica of step (1) is selected from one or more of clay, diatomite, expanded perlite, siliceous rock, hydrolysis silica, macroporous silica, and silica gel.

13. The process of claim 11, wherein the metal oxide is selected from an oxide of vanadium, zinc or molybdenum, and the precursor of the metal oxides is selected from sulfides, sulfates, hydroxides, carbonates, acetates and nitrates.

14. The process of claim 11, wherein the inorganic oxide binder precursor of step (1) is selected from one or more of alumina, silica and amorphous silica-alumina precursor.

15. The process of claim 11, wherein the gas of step (2) is anhydrous inert gas.

16. The process of claim 11, wherein the gas temperature is about 50° C. to about 200° C., and the pressure of the gas is about 1 atm to about 5 atm.

17. The process of claim 11, wherein the organic compound containing the accelerant metal is an organic compound with a vapor pressure of about 0.5 kPa to about 100 kPa under 298K.

18. The process of claim 17, wherein the organic compound containing the accelerant metal is selected from one or more of formates, acetates, metal carbonyls, and naphthenates of nickel, cobalt, manganese, iron, copper, silver, molybdenum, chromium, vanadium, tungsten, and lanthanide.

19. The process of claim 11, wherein the organic compound containing the accelerant metal is nickel tetracarbonyl.

20. The process of claim 11, wherein the accelerant metal of step (4) is reduced in a reducing atmosphere, thereby producing an accelerant metal component in substantially zero valence state.

21. The process of claim 11, wherein at least one accelerant metal which is capable of reducing the sulfur in oxidized state to hydrogen sulfide present in the adsorbent obtained in step (4) is dispersed on the surface of the carrier substantially as a monolayer.

22. A method for desulfurizing cracking gasoline or diesel fuel, comprising contacting the sulfur containing material with the adsorbent of claim 1, during which the sulfur contained in the material is adsorbed in the adsorbent and thus a product having low sulfur content is obtained.

23. The method of claim 22, wherein the contacting conditions are:
    a temperature of about 350° C. to about 500° C.; a weight space velocity of about 2 $h^{-1}$ to about 8 $h^{-1}$; and a pressure of about 1000 KPa to about 5000 KPa.

* * * * *